March 23, 1965

J. COHN ETAL 3,175,191

BINARY CODE SIGNALLING SYSTEM HAVING A BINARY
COUNTER AT THE RECEIVER RESPONSIVE
TO A SELECTED CODE

Filed Jan. 14, 1960

INVENTORS
Jona Cohn, Martin Cooper &
BY   Theodore Saltzberg

Mueller + Aichele

Attys.

March 23, 1965

J. COHN ETAL 3,175,191

BINARY CODE SIGNALLING SYSTEM HAVING A BINARY
COUNTER AT THE RECEIVER RESPONSIVE
TO A SELECTED CODE

Filed Jan. 14, 1960

INVENTORS
Jona Cohn, Martin Cooper &
BY    Theodore Saltzberg.

Mueller & Aichele
Attys.

United States Patent Office 3,175,191
Patented Mar. 23, 1965

3,175,191
BINARY CODE SIGNALLING SYSTEM HAVING A BINARY COUNTER AT THE RECEIVER RESPONSIVE TO A SELECTED CODE
Jona Cohn, Morton Grove, Martin Cooper, Skokie, and Theodore Saltzberg, Chicago, Ill., assignors to Motorola, Inc., Chicago, Ill., a corporation of Illinois
Filed Jan. 14, 1960, Ser. No. 2,503
13 Claims. (Cl. 340—164)

This invention relates generally to selective signalling systems for use with radio communications equipment, and more particularly to a selective system which operates with transmissions that provide pulses in sequence according to a binary code.

Selective calling equipment is sometimes provided in mobile and aircraft radio communications networks so that individual stations can be called from a base station. In certain applications there is need for a selective calling system which has a very large code capacity and which operates faster than presently available systems. Furthermore, there is need in certain applications for a system in which encoding and decoding functions and a number of specific functions may be performed by a basic processing circuit provided with suitable auxiliary circuits.

An object of the present invention is to provide a selective calling system with simple and effective circuits for encoding and decoding pulse signals according to a binary code.

Another object of the invention is to provide an improved selective system in which decoding is accomplished by a plurality of selective stages which respond to binary pulses provided by a calling signal.

A further object of the invention is to provide a binary selective calling system as described above in which the number of subscribers that can be handled by the system depends on the number of selective stages provided in the decoding circuits, so that the code capacity can be greatly expanded by adding one or more selective stages.

Still another object of the invention is to provide a selective calling system which permits calling of one, some, or all of a large number of subscriber stations, and which may also provide auxilary functions such as acknowledgement by a subscriber station to the base station that a call has been received, interstation calling between subscriber stations, and automatic operation of control functions at the subscriber stations.

A feature of the invention is the provision of a selective system for processing code pulses, including a plurality of selective stages connected in a chain in a manner such that each stage following the first one is enabled in sequence by the preceding stage and then responds to an input pulse. With this arrangement, decoding is accomplished directily by the selective stages, and associated circuitry is simplified.

A further feature of the invention is the provision of a decoder with a selective system as described in the preceding paragraph and a decoding control circuit including a plurality of switches for applying binary code pulses to the selective stages in a predetermined sequence such that the chain will advance through a cycle only if the number and sequence of the binary pulses corresponds to the number of selective stages and the sequence in which the pulses are applied thereto, thereby insuring reliable decoding.

Another feature is the provision of an encoder including a selective system as described above, a pulse source for supplying uninterrupted pulses to the chain of selective stages for advancing the same through a cycle, an encoding control section which receives output pulses from the individual selective stages as they advance through a cycle, and which includes control circuits that convert the output pulses from the selective stages into binary code pulses. The pulses are arranged in a sequence according to the settings of switches associated with the control circuits.

The invention is illustrated in the accompanying drawings in which.

The selective calling system of the invention includes an encoder unit and a decoder unit, each of which has a selective circuit which can be operated either to decode or encode a calling signal in which the code information corresponds to binary pulses. The selective circuit is essentially a binary ring counter consisting of a series of selective stages, with the number of stages being the same as the number of binary pulses. Each selective stage has one stable state in which it is enabled to be switched by an input pulse, and another stable state in which it is disabled and therefore cannot be switched by an input pulse.

The encoder unit of the invention is provided with a multi-stage counter circuit as described above, and the input to this circuit is a series of uninterrupted pulses that will advance the counter through a cycle. An output is taken from each counter stage, and these outputs are converted to "zero" and "one" binary pulses in a sequence that depends upon the settings of selector switches. The binary pulses may be converted into tones for purposes of transmission.

The decoder unit of the invention is also provided with a counter circuit as described above, and the individual selective stages are connected to one or the other of a pair of signal lines in a predetermined sequence. The received transmission or calling signal is converted into "zero" and "one" binary pulses. The "zero" pulses are supplied to one of the signal lines and the "one" pulses are supplied to the other signal line. The counter will advance through a cycle if the number and sequence of the binary pulses corresponds to the number of selective stages and the sequence in which they are connected to the signal lines. An output signal will be produced by the counter only if it advances through a complete cycle, and this output signal may be utilized to operate suitable alarm devices which indicate the reception of an incoming call. It is also possible to operate a single counter circuit in both an encoding mode and a decoding mode to provide a combined encoder-decoder unit.

Figure 1:
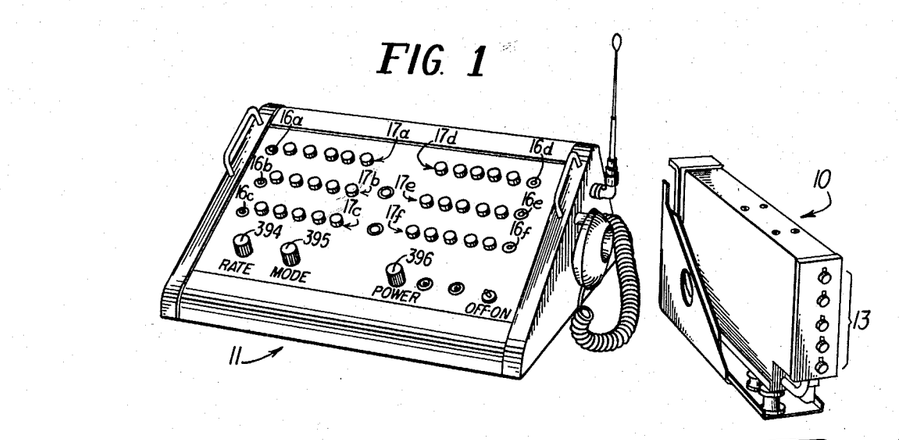
FIG. 1 is a view of an encoder unit and a decoder unit for a selective calling system in accordance with the invention.

Referring to the drawings, FIG. 1 shows a decoder unit 10 for use at a subscriber station and an encoder unit 11 for use at a base station of a communications network. The particular construction of the decoder 10 illustrated in FIG. 1 is adapted for aircraft installation, but it will be understood that the selective calling system of the invention is not restricted to aircraft applications. The decoder operates from standard communication receivers and is fully transistorized. Thus, the unit 10 is compact and lightweight, and the operating voltage can be obtained directly from the primary power source of the vehicle in which it is installed. The decoder 10 as illustrated can be set to respond to any one of 248,832 codes by means of five rotary code selectors 13 on the front panel. Received coded signals are processed within the decoder, and when the call code identified with the unit 10 is received, the unit triggers suitable alarms to alert the operator. FIG. 3 shows the decoder 10 with the housing or cover 14 removed, and this view illustrates that the unit is completely electronic. Because of this, it is possible to handle many more subscriber stations with the system of the invention than with known systems and still have compact decoder units such as those illustrated in FIGS. 1 and 2.

Figure 2:
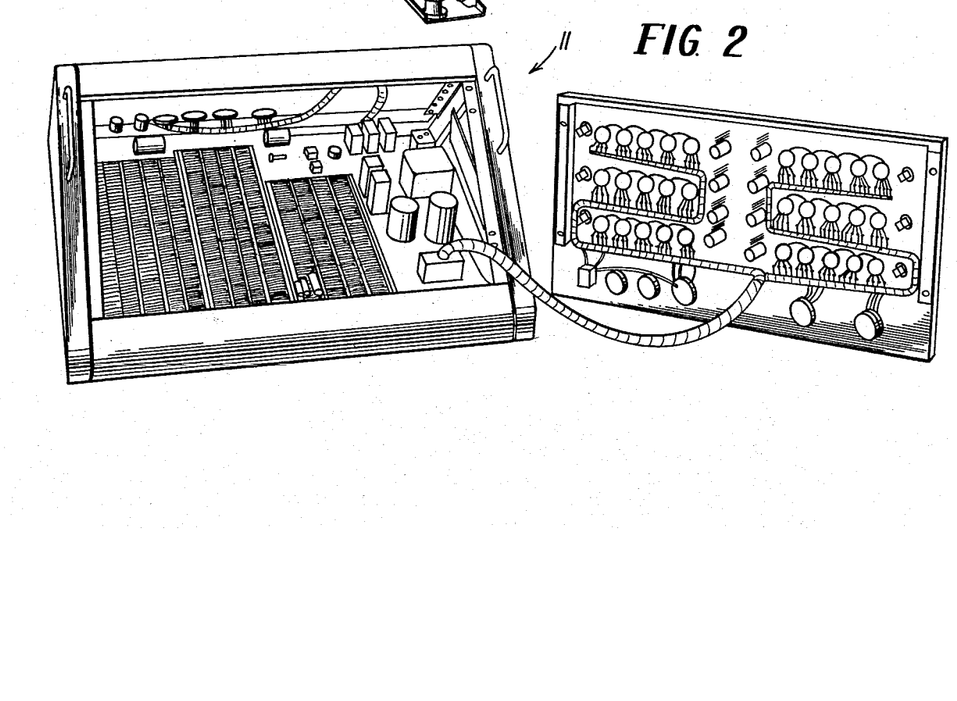
FIG. 2 is a view of the encoder unit of FIG. 1 with the front panel removed.
Figures 3, 4, 5:
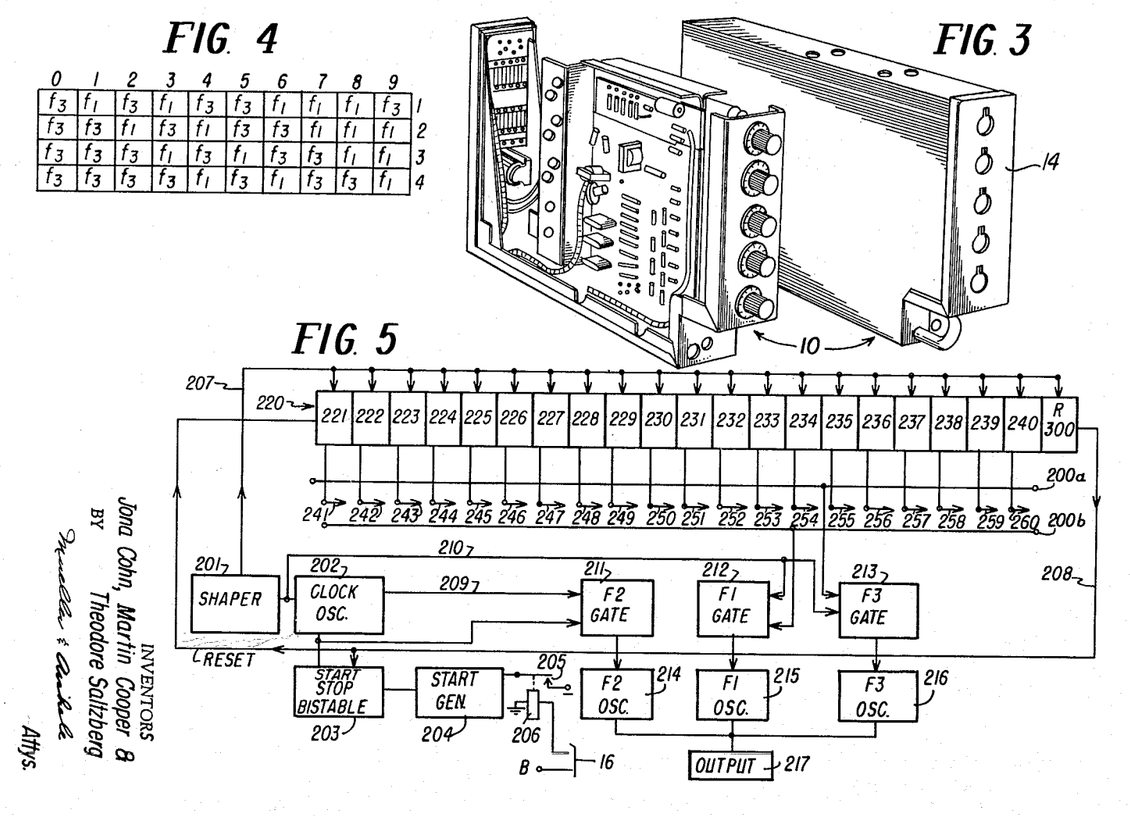
FIG. 3 is a view of the decoder unit of FIG. 1 with the housing removed.
FIG. 4 is a table illustrating the code for the calling signal employed with the system of FIG. 1.
FIG. 5 is a simplified block diagram illustrating the basic principles of the encoder unit of FIG. 2.

The encoder unit 11 of FIGS. 1 and 2 has six sets of code selectors designated generally as 17a, 17b, 17c, 17d, 17e, and 17f with each set having five rotary selectors. A call button 16 is associated with each set of code selectors. Any station in the communications network provided with the selective calling system may be called by rotating the five selectors of any one set in order to set up the code call of the desired station, and then depressing the associated call button. It is possible to preset six different calls on the six different sets of selectors and selectively transmit these calls merely by depressing the call buttons. A switch 394 provides selection between slow and fast calling rates, and another switch 395 provides selection between different calling modes. In one position of switch 395, the encoder provides a completely encoded signal for calling a single subscriber station. In another position of switch 395 the calling signal is entirely uncoded for calling all stations at once. In the other positions, one or more digits are uncoded and the others are encoded to permit calling groups of stations.

The calling signal which is supplied to the decoder unit may carry the code information in one of several specific ways. For example, by frequency-shift or phase-shift of a carrier wave the code information may be carried in the transitions between frequencies or phases, and these transitions may be converted into pulses at the decoder unit. The calling signal provides sequential pulses which may be considered as a series of pulse groups, with each group corresponding to a digit of a call number. The system described employs five-digit decimal numbers, and therefore the transmission will include five pulse groups which will provide for any decimal number in the range from 00000 through 99999. Each pulse group consists of a definite number of pulses (four in the present system), and certain ones of these pulses represent the binary number zero while others represent the binary number one. The zero-pulses and the one-pulses are separated in the decoder and are routed in different paths. Although it is possible to provide binary decoding systems in which the zero-pulses, for example, are suppressed or inverted in polarity with respect to the one-pulses, it has been found that separating the zero and one pulses simplifies the decoding circuitry.

In the particular embodiment illustrated in the drawings, the calling signal is a frequency shift keyed signal employing three separate frequencies or tones. The tones are transmitted in bursts, with every other burst being a center frequency $F_2$ which provides for pulse spacing and has no code function. The other two tone frequencies designated $F_1$ and $F_3$ are the binary information carriers. Four of the $F_1$ and $F_3$ frequency bursts provide the information required to represent one decimal digit of the call number. These frequency bursts are translated into zero and one pulses in the decoder, and the decimal digits of the call are represented by pulse groups, each of which consists of four of the zero and one pulses as mentioned above.

The various sequences which are employed to encode decimal digits from 0 through 9 are illustrated in a table in FIG. 4. It should be noted that this table gives only the sequence of the information tones $F_1$ and $F_3$. Although the $F_2$ tones are omitted in the table, it should be undersetood that the transmission includes an $F_2$ tone before each information tone.

Figure 8:
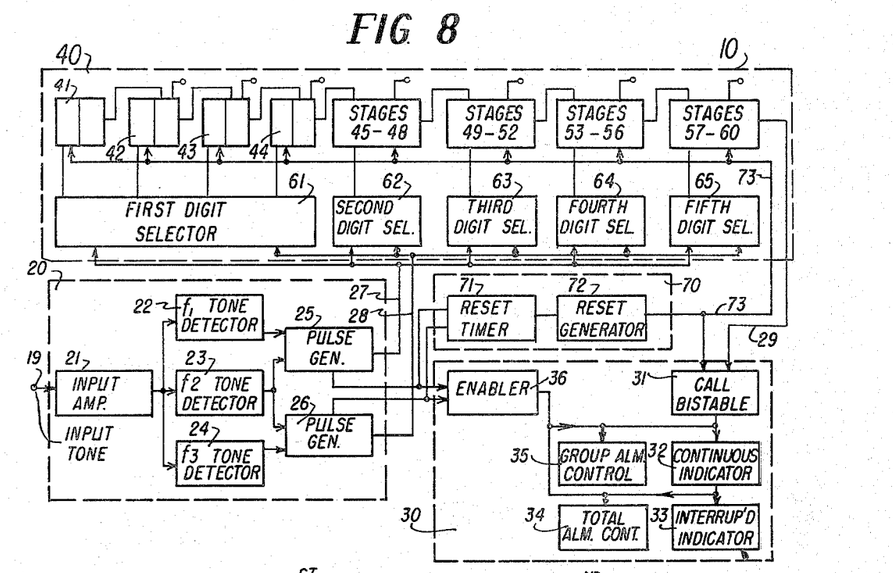
FIG. 8 is a block diagram illustrating the main circuits of the decoder unit of FIG. 3.
Figure 9:
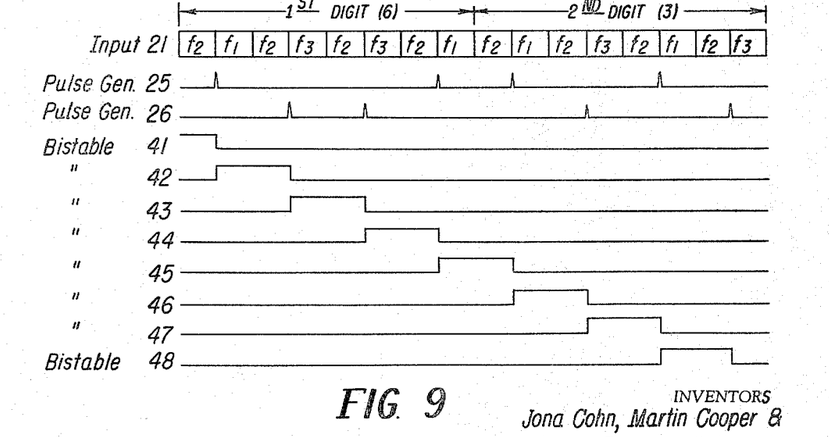
FIG. 9 shows waveforms for various ones of the circuits included in FIG. 8.

FIG. 9 shows the operation of the tones of two groups which represent two digits. The frequency shift keyed calling signal is represented by the top line 21 of FIG. 9. This shows the tone sequence for the first two digits of a call, with the particular digits of the call illustrated being 6 and 3. The rest of the waveforms in FIG. 9 show the operation of the various blocks in the diagram of FIG. 8 which will be described later.

*Encoding in general*

Figure 6:
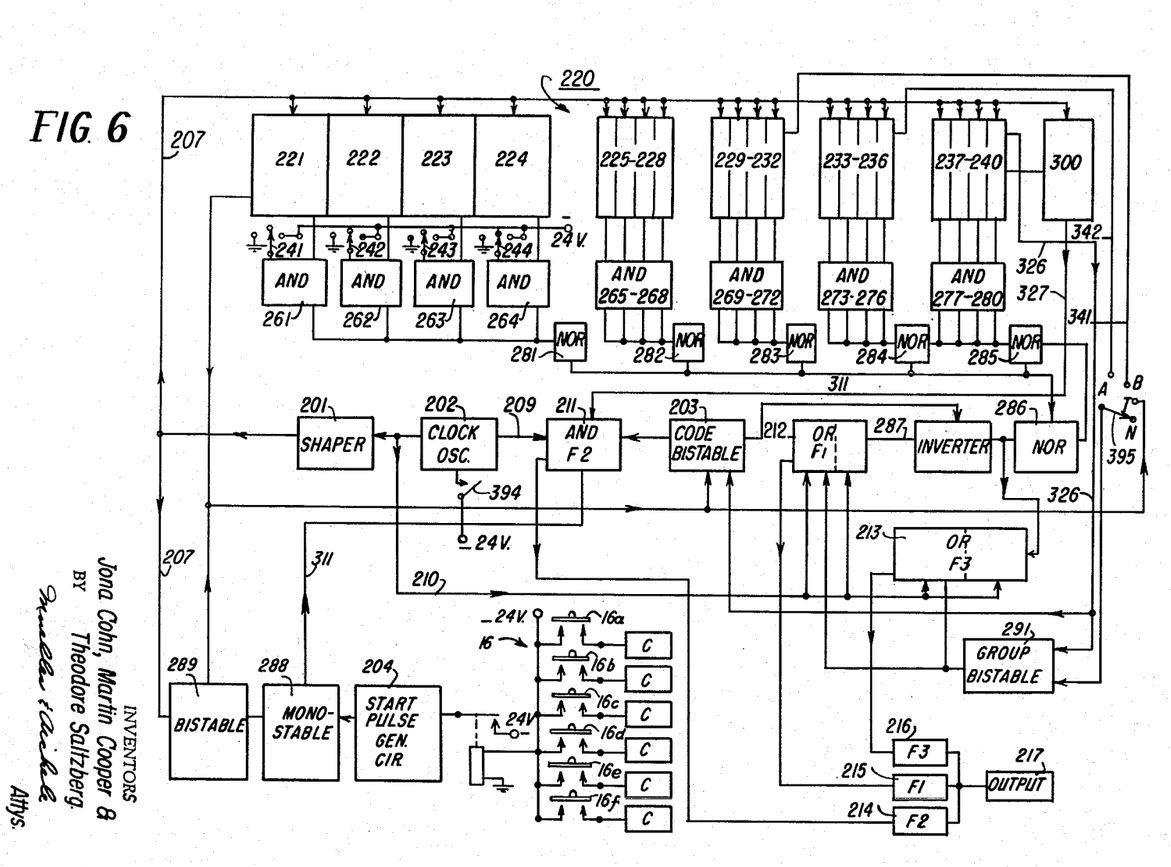
FIG. 6 is a block diagram illustrating the main circuits of the encoder unit of FIG. 2.
Figure 7:
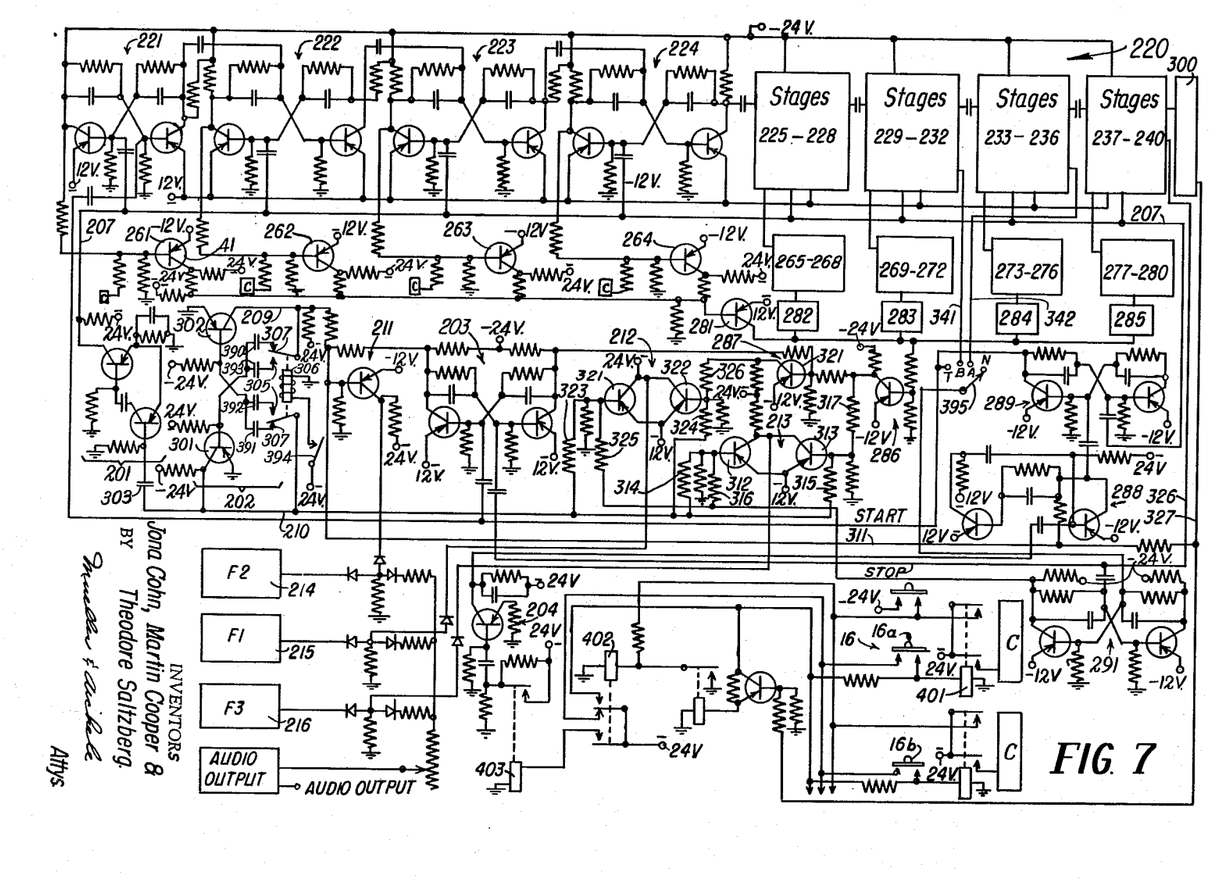
FIG. 7 is a detailed circuit diagram for a portion of the encoder unit of FIG. 2.

The circuits and operation of the encoder unit 11 will be described in connection with FIGS. 5, 6 and 7. FIG. 5 is a simplified block diagram which is provided to facilitate understanding the encoder. FIGS. 6 and 7 are more detailed and illustrate actual encoder units built in accordance with the invention.

In FIG. 5, there is a counter circuit 220 including twenty stages numbered 221–240. An additional counter stage 300 is provided for reset purposes as will be explained. The individual counter stages 221–240 are connected in parallel to an input line 207, and input pulses are supplied to line 207 from the clock oscillator 202 through the shaper 201. The input to the counter is a series of uninterrupted clock pulses which will advance the counter through a complete cycle. In the specification and claims, when reference is made to a selective stage that is conditioned to respond to an input pulse, the stage is said to be "enabled," and when it is not so conditioned it is said to be "disabled." Stage 221 is switched from an enabled to a disabled condition by the first input pulse, and the succeeding stages 222–240 are enabled by the switching of the preceding stage and are then switched to the disabled condition by an input pulse.

Outputs are taken from each of the individual counter stages 221–240 and are applied through selector circuits, represented in FIG. 5 by the switches 241–260, to a pair of selection gates 212 and 213. The switching of any one of stages 221–240 from the enabled to the disabled condition provides an output voltage that actuates one or the other of the gates 212 or 213. Gate 212 controls the $F_1$ oscillator 215 and gate 213 controls the $F_3$ oscillator 216. Another gate 211 controls the $F_2$ oscillator 214. The tones provided by the oscillators 214–216 are applied to the output section 217.

Each of the gates 211–213 has two inputs, and both inputs must be actuated in order for the gate to operate. One of the inputs of each of the gates 212 and 213 is connected to the counter 220 as previously explained, and the other input is connected to the clock oscillator 202. Thus, when either gate 212 or gate 213 simultaneously receives a clock pulse and an output from the counter it will be actuated to cause the corresponding tone to be transmitted.

The $F_2$ gate 211 also has one input connected to the clock oscillator 202, and its other input is connected to the start-stop bistable circuit 203. The bistable circuit 203 enables the $F_2$ gate 211 when the call switch 16 is depressed, so that each pulse supplied from clock 202 to the $F_2$ gate 211 will actuate gate 211 and cause an $F_2$ tone to be transmitted. The clock pulses supplied to gate 211 are out of phase with the clock pulses supplied to gates 212 and 213 so that an $F_2$ tone will precede each $F_1$ or $F_3$ tone as previously explained.

Operation of the encoder is initiated by depressing the call switch 16. This energizes relay 206 to close contacts 205 and apply energizing voltage to the start pulse generator 204. The start pulse generator 204 applies a signal to the start-stop bistable circuit 203 which causes it to switch from one state to the other. Switching of the start-stop bistable 203 injects a "one" pulse into the counter stages, actuates the clock oscillator 202, and also enables the $F_2$ gate 211. Clock pulses are supplied to gate 211 through line 209 and to gates 212 and 213 through line 210. The first counter stage 221 may be initially enabled, or may be placed in the enabled condition before the clock pulses are applied to the counter as will further be explained. In either case, the first clock pulse drives stage 221 from the enabled to the disabled condition. The switches 241–260 each have an upper portion (as viewed in FIG. 5) in which they connect the counter outputs to signal line 200a, and a lower portion in which they connect the counter outputs to signal line 200b. If switch 241 is set in the upper position the transition of stage 221 will actuate the $F_3$ gate 213, whereas if switch 241 is set in the lower position the transition of stage 221 will actuate the $F_1$ gate 212. The transition of stage 221 will also enable the second counter stage 222, and this will be returned to the disabled condition by the second clock pulse appearing on line 207. If switch 242 is in the upper position, the transition of counter stage 222 will actuate the $F_3$ gate 213, and if switch 242 is in the lower position the transition of counter stage 222 will actuate the $F_1$ gate 212. The clock pulses on line 207 will advance the counter 220 through a complete cycle by this successive enabling and disabling of the individual stages, and the $F_1$ and $F_3$ tones are transmitted in a predetermined sequence according to the settings of the switches 241–260.

The twenty-first pulse appearing on line 207 will cause the reset counter stage 300 to be switched to the disabled condition. An output is taken from stage 300 and is applied through line 208 to the start-stop bistable circuit 203. This switches bistable circuit 203 back to the initial condition, blocking the output of the clock oscillator 202 and also disabling the $F_2$ gate 211. The reset signal may be applied to the first counter stage 221 to switch it to the enabled condition, or this stage may be left in the disabled condition until another call is transmitted.

In this explanation of the encoder, certain aspects of the circuits have been omitted and others have been simplified for purposes of providing an overall understanding of the encoding operation. The complete circuits and operation of the encoder will be described in connection with FIGS. 6 and 7. One feature of the encoder illustrated in FIGS. 6 and 7 and not in FIG. 5 is that several sets of selector switches may be provided instead of just the one set indicated in FIG. 5. This is accomplished by feeding the outputs from the individual counter stages to "And" gates which may be controlled to either pass or suppress the outputs by means of selector switches. The complete encoder is adapted to provide calling of individual stations and also provides calling of selected groups of stations (group calling) as well as calling all stations of the communications system (total calling).

*Encoding private calls*

The encoder of FIGS. 6 and 7 includes a ring counter circuit 220 having twenty bistable stages numbered 221–240 inclusive. An additional bistable stage 300 is provided for reset purposes. Clock pulses are supplied to the individual stages of the counter from the clock oscillator 202 through the clock shaper 201 and line 207. The clock oscillator 202 is a multi-vibrator circuit including two transistors 301 and 302 which are alternately turned on and off when the clock is operating. The clock shaper 201 is A.C. coupled to the clock oscillator 202 by the capacitor 303 so that each transition of the oscillator 202 from one state to the other causes the shaper to apply a spike pulse to line 207. The voltage transitions of transistor 301 are applied through line 210 to the $F_1$ and $F_3$ selection gates 212 and 213, and the voltage transitions of transistor 302 are applied through line 209 to the $F_2$ selection gate 211.

The clock oscillator 202 may be operated at a slow rate or at a fast rate by means of the relay 306. When relay 306 is deenergized, contacts 307 are closed to connect capacitors 390 and 391 into the oscillator circuit, and this causes the oscillator to operate at the slow rate. When relay 306 is energized, contacts 305 are closed to connect capacitors 392 and 393 into the oscillator circuit, and this causes the oscillator to operate at a faster rate. Energization of relay 306 is controlled by the rate selector switch 394 which may be mounted on the front panel of the encoder as shown in FIG. 1.

The clock 202 oscillates continuously when power is supplied to the encoder. The power supply is controlled by switch 396 also mounted on the front panel of the encoder as indicated in FIG. 1. When switch 396 is on, minus 24 or minus 12 volts D.C. is applied to the supply voltage terminals as indicated in FIG. 7. The pulses generated by the clock oscillator 202 have no effect on the encoder until one of the call switches designated generally as 16 is operated. This is because all stages of the counter 220 are in the disabled condition until a call switch is actuated.

If, for example, call switch 16a is depressed, relays 401, 402 and 403 are energized to apply operating voltage to the start pulse generator 204. The start pulse generator produces a pulse which actuates the monostable multivibrator circuit 288, and this causes the bistable circuit 289 to change from one state to the other. The transition of the bistable circuit 289 causes the first bistable stage 221 of the counter to change from the disabled state to the enabled state so that it will respond to the next pulse generated by the clock oscillator 202. The transition of bistable circuit 289 also causes the start-stop bistable circuit 203 to change states, and this enables the $F_2$ selection gate 211 so that it will respond to the next clock pulse applied thereto over line 209. The next clock pulse following the initial transition of bistable circuit 289 is applied to this circuit over line 207 causing it to switch back to its original condition.

As mentioned previously, it is desired to have the $F_2$ tones sent out before each of the information tones. The clock pulses applied to the $F_2$ selection gate 211 over line 209 are out of phase with the clock pulses applied to the counter over line 207, and therefore gate 211 will be actuated shortly after each step of the counter. It is desirable to send out a burst of $F_2$ at the beginning of the call to condition the detectors of the decoder for operation. This is accomplished by the monostable circuit 288 which applies a voltage over line 311 to the $F_2$ selection gate 211 causing it to actuate the $F_2$ oscillator 214 for a substantial time at the beginning of the call. Then subsequent actuation of the $F_2$ selection gate 211 is controlled by the clock oscillator 202 as previously explained.

The $F_1$ and $F_3$ tones are produced by the tone oscillators 215 and 216, and these oscillators are controlled respectively by the $F_1$ selection gate 212 and the $F_3$ selection gate 213. The circuits of the $F_1$ and $F_3$ gates are substantially identical, and each consists of a pair of "And" gates connected together so as to provide an overall "Or" gate. This will be explained further. The $F_3$ gate 213 includes a pair of transistors 312 and 313, and each of these transistors has two inputs. Inputs 314 and 315 supply clock pulses to both of these transistors. Input 316 for transistor 312 is connected to the group bistable 291, and input 317 for transistor 313 is connected to a "Nor" gate 286.

The $F_1$ selection gate 212 also has two transistors 321 and 322. Clock pulses are supplied to both of these transistors through inputs 323 and 324, and input 325 for transistor 321 is connected to the group bistable circuit 291. The other input 326 for transistor 322 is connected to an inverter circuit 287 which in turn is connected to the "Nor" gate 286.

The "Nor" gate 286 receives outputs from the "And" gates 261–280 connected respectively to the individual counter stages 221–240. The "And" gates 261–280 are controlled by switches, some of which are illustrated schematically in FIG. 6 by the switch contacts 241–244. These switch contacts are actually part of code selector circuits represented by the boxes labeled C in both FIGS. 6 and 7. When the switch contacts are in one position, minus 24 volts is supplied to the "And" gates, and these gates will then pass the outputs from the counter stages. When the switch contacts are in the other position, the "And" gates will not pass outputs from the counter stages. By setting up the selector switch contacts in a predetermined sequence according to the code call which it is desired to transmit, the outputs of the counter stages 221–240 will either be passed or suppressed to supply zero and one pulses to the "Nor" gate 286 in the desired sequence. Actually, the zero and one pulses first pass through intermediate "Nor" gates 281–285 before being applied to the "Nor" gate 286. The combined effect of "Nor" gates 281–285 and "Nor" gate 286 is that of a single "Or" gate connected in parallel to all of the "And" gates 261–280.

When the first clock pulse generated after the call has been initiated is applied to the counter 220, it causes counter stage 221 to switch from the enabled to the disabled condition. The transition of counter stage 221 applies a voltage to the "And" gate 261. If, for example, the switch contact 241 (FIG. 6) is in the right-hand position, minus 24 volts is applied to the "And" gate 261, and this combined with the voltage from counter stage 221 causes "And" gate 261 to apply a one pulse to the "Nor" gate 281. The "Nor" gate 281 inverts this pulse, and the inverted pulse is applied to the "Nor" gate 286 which re-inverts the pulse. The output of "Nor" gate 286 is applied to transistor 313 of "Or" gate 213 and is also applied to the inverter circuit 287. Transistors 313 and 321 are driven into conduction by this pulse. The conduction of transistor 321 inhibits the $F_1$ selection gate 212 and transistor 322 thereof does not conduct. The conduction of transistor 313 applies a pulse to the $F_3$ oscillator circuit 216 causing it to generate an $F_3$ tone.

The switching of the first stage 221 of the counter 220 enables the second stage 222. Stage 222 is switched from the enabled state to the disabled state by the second clock pulse applied thereto over line 207. The transition of stage 222 produces a pulse which is applied to the "And" gate 262. If the selector contacts 242 are in the left-hand position (FIG. 6) ground potential is applied to the "And" gate 262, and therefore this gate will not pass the pulse output from counter stage 222. The outputs of the "Nor" gates 281 and 286 revert back to minus 12 volts, and this turns off transistors 313 and 321. Transistor 321 then applies minus 24 volts to transistor 322 of "Or" gate 212, and transistor 322 is driven into conduction and applies a pulse to the $F_1$ oscillator 215 to send out an $F_2$ tone.

It should be remembered that between each of the $F_1$ and $F_3$ tones, the $F_2$ selection gate 211 is triggered by a clock pulse and an $F_2$ tone is generated by oscillator 214.

The counter 220 is advanced through a cycle by the clock pulses, and the "And" gate 261–280 either pass or suppress the outputs of the individual counter stages according to the settings of the code selectors C associated with these gates. Thus, the output of the "Nor" gate 286 is a series of zero and one pulses sequenced according to the code call that has been set into the code selector switches, and these pulses are selected respectively by the $F_1$ and $F_3$ selection gates 212 and 213 to control the oscillators 215 and 216 according to the desired code call.

When the twentieth counter stage 240 is actuated, a pulse is supplied thereby through line 326 to the bistable circuit 203 causing it to switch back to its initial state. The bistable circuit 203 then ceases to enable the $F_2$ selection gate 211 and also applies a voltage to the inverter circuit 287 causing it to conduct and inhibit the transistor 322 of gate 212. Transistor 313 of gate 213 is inhibited by the "Nor" gate 286 which is conducting when all of the counter stages are in the disabled condition. This effectively shuts off the $F_1$ and $F_3$ selection gates 212 and 213. However, the clock oscillator is still running, and when the reset counter stage 300 is switched to the enabled condition it applies a voltage through lines 327 and 311 to the $F_2$ selection gate 211 enabling it to respond to the clock pulse simultaneously applied thereto over line 209. This ensures that the last pulse of the call is an $F_2$ tone. The twenty-first clock pulse switches reset stage 300 back to the disabled condition, and since all stages of the counter are now in the disabled condition, the counter will not respond to further clock pulses. All parts of the encoder have been returned to their original condition and are ready to encode another call.

*Encoding of total and group calls*

If it is desired to send out a group call or a total call, the switch 395, which is mounted on the front panel of the encoder as indicated in FIG. 1, is moved from the position marked N which is for private calls to one of the other positions. In the position marked T, the encoder will send out a call that will be decoded by all stations of the system. In this mode of operation, the output of the encoder consists of simultaneous $F_1$ and $F_3$ tones alternated with $F_2$ tones. The manner in which this is accomplished will now be described.

With switch 395 in the position marked T, the bistable circuit 289 is connected through switch 395 to the group bistable circuit 291. Thus, when bistable circuit 289 is switched at the beginning of the call as previously explained, it will cause the group bistable 291 to change states. Bistable 291 applies an enabling voltage to transistors 312 and 321 of the $F_3$ and $F_1$ selection gates respectively. Thus, each time a clock pulse is applied to these selection gates over line 210, the $F_1$ and $F_3$ gates 212 and 213 will be actuated and will cause the $F_1$ and $F_3$ oscillators to operate simultaneously. The $F_1$ and $F_3$ bursts are separated by bursts of $F_2$ which are generated in the manner previously described.

With switch 395 in the position marked B, the group bistable circuit 291 is connected through line 341 to the twelfth counter stage 232. The call is encoded in the manner previously described for the first three digits, and then the twelfth counter stage 232 causes the group bistable 291 to change states. This enables the $F_1$ and $F_3$ gate transistors 321 and 312 so that for the rest of the call, the $F_1$ and $F_3$ gates 212 and 213 will be actuated simultaneously by the clock pulses applied thereto over line 210. Thus, the call will consist of coded information in the form of sequenced $F_1$ and $F_3$ bursts corresponding to the first three digits of the call, and uncoded information in the form of simultaneous $F_1$ and $F_3$ bursts for the remainder of the call. Of course, $F_2$ tones are also interspersed as previously explained. All decoders having these same first three digits in their call code will respond to this call signal.

With switch 395 in the position marked A, the sixteenth counter stage 236 is connected to the group bistable circuit 291 by line 342. Therefore, the call is encoded through the first four digits, and the rest of the call is uncoded. The mode of operation is exactly the same as described for the encoder when switch 19 is in position B. All decoder units having these same first four digits in their call code will decode this particular call signal.

The group bistable circuit 291 is switched back to its initial stage by an output from stage 240 at the end of the fifth digit of the call. When the reset stage 300 is enabled, it causes the $F_2$ gate 211 to actuate oscillator 214 to provide a burst of $F_2$ at the end of the call to ensure that the decoders receiving the call are properly conditioned for the next call as will be explained.

*Decoding in general*

The main sections of the decoder 10 as illustrated in FIG. 8 are the input section 20, the output section 30, the selective section 40, and the reset section 70. The input section 20 includes an amplifier 21, three detectors 22–24, and two pulse generators 25 and 26. The tone input is supplied to terminal 19. The input section 20 converts the alternating tone input into a series of zero and one pulses, and supplies the zero pulses through one line 27 to the selective section and the one pulses through another line 28 to the selective section. The pulses are routed through selector switches 61–65 to the various stages 41–60 connected as a ring counter. In general terms, the counter is conditioned by means of the selector switches 61–65 so that it will advance through a cycle and provide an output signal in response to an input signal representing a particular code call, and will not be advanced through a cycle by an input signal representing any other code call. More specifically, the counter 40 will advance through a cycle only if the zero and one pulses supplied to it from the input lines 27 and 28 are arranged according to the sequence in which the stages are connected to these lines. The cycle is completed when the last stage 60 of the counter operates in response to the last pulse provided by the call signal. This operation provides an output which is supplied through line 29 to the output section 30.

The counter output triggers the call bistable circuit 31 from its initial state to a second state, and this circuit provides a pulse which activates suitable alarm devices such as the continuous indicator 32 and the interrupted indicator 33. The continuous indicator 32 may be a relay circuit connected to operate an external light or a buzzer when the relay is energized. The continuous indicator 32 also activates the interrupted indicator 33 which operates, for instance, a flashing light. The group alarm 35 is activated when the decoder unit being considered and several other decoder units are called at the same time, and the total alarm 34 is activated when all decoder units in a given system are activated at the same time.

The alarm devices 32–35 remain energized until they are manually reset. However, the selective section 40 is reset by a pulse supplied from the reset section 70 shortly after the last pulse of the call is received. Thus, the counter is reset automatically regardless of whether the output section has been actuated. The reset section 70 includes a timer or activity checker 71 which receives pulses from the two pulse generators 25 and 26. The timer 71 responds to the first pulse in the call and conditions the reset generator 72 for actuation. As long as pulses are applied to the timer, the reset generator 72 remains in this ready state. Shortly after the last pulse in the call, the timer 71 triggers the reset generator so that it applies a reset pulse to line 73. The reset pulse returns the bistable stages 41–60 of the counter, and also the bistable circuit 31 of the output section, to the initial condition to put them in readiness for the reception of another call. Most of bistable stages of the counter are already in the initial condition, so the reset pulse does not actually affect them.

*Specific decoder circuits and operation*

The detailed circuits and the specific operation of the decoder will be described in connection with FIG. 10. The circuit diagram of FIG. 10 corresponds to the block diagram of FIG. 8, and like units are identified by the same reference characters. The amplified tone input is supplied to terminal 81, and the tones are developed across a grounded resistor 82. The tones are applied to the three tone detectors 22–24 each of which includes a tuned circuit, a transistor connected as an emitter follower, and a rectifying network. Capacitor 83 and inductor 84 are tuned to pass the $F_1$ frequency, and capacitor 87 and inductor 88 are tuned to pass the $F_3$ frequency. The first tone in the call signal which is represented by line 21 of FIG. 9, is a burst of the $F_2$ frequency. Transistor 92 and the associated tuned circuit formed by capacitor 85 and inductor 86 accept this tone burst and apply it to the rectifier network consisting of diodes 99 and 100. Diode 100 conducts on positive swings of the $F_2$ tone, and this charges capacitor 104 to a positive level.

The output from the detector 23 is applied to the two pulse generators 25 and 26 through the emitter followers 106 and 109. The pulse generators include identical trigger circuits 107 and 110 and pulse amplifiers 108 and 111. The $F_2$ input forces both of the triggers 107 and 110 into a state such that the amplifiers 108 and 111 are cut off, and thus full negative battery voltage is supplied to the counter input lines 27 and 28. This is represented by the steady voltage at the beginning of the waveforms 25 and 26 illustrated in FIG. 9.

Next, an $F_1$ tone burst is applied to the tone detectors, and the emitter follower 91 with its associated tuned circuit formed by capacitor 83 and inductor 84 accept this tone and apply it to the rectifier network consisting of diodes 97 and 98. Diode 98 conducts on negative swings of the $F_1$ tone charging capacitor 103 negatively, and the voltage on capacitor 104 decays since no $F_2$ tone is present. The voltage on capacitor 103 is applied through the emitter follower 106 to the trigger circuit 107 which changes state and causes the output of the amplifier 108 to swing in a positive direction. The input to amplifier 108 is differentiated so that the output is a positive spike corresponding to the transition between $F_2$ and $F_1$ as illustrated in the waveform 25 of FIG. 9.

The next burst of $F_2$ causes the tone detector 23 to operate in the manner previously described and returns the trigger circuit 107 to its initial state. Then a burst of $F_3$ is applied to the tone detectors, and this is accepted by emitter follower 93 with its associated tuned circuit, rectified by diodes 101 and 102, and applied by capacitor 105 to pulse generator 26. The emitter follower 109, the trigger circuit 110, and the pulse amplifier 111 respond to this input in exactly the same way as described in connection with pulse generator 25. The result is a positive spike applied to line 28 as illustrated by the first spike in the waveform 26 of FIG. 6. Successive tones in the input 21 are detected and converted to pulses by the generators 25 and 26 in the same manner so that the pulses supplied by the input section 20 conform to waveforms 25 and 26.

The actual decoding of the information represented by the pulse waveforms 25 and 26 is accomplished entirely by the selective section 40. The selective response of the decoder is determined by the sequence in which the various stages 41–60 are connected to the two counter input lines 27 and 28. In the embodiment illustrated in FIG. 10, these connections are made through the selector switches 61–65, and the switches permit the selective response of the unit to be changed without doing any rewiring. However, it should be understood that the selector switches may be omitted in applications where the code call assigned to the unit will be permanent.

The stages 41-60 inclusive are connected in series and form a binary ring counter. Each of the counter stages is a bistable device including a pair of transistors connected so that when one transistor is conducting the other transistor is cut off. In FIG. 10 the transistors are identified by the number of the stages followed by the letter X or the letter Y. The pulses supplied by input lines 27 and 28 are applied to the transistors marked X, and an enabling output is taken from the transistors marked Y. The reset signal is applied to the various stages through line 73, and it may be seen that in stage 41 the reset pulse is applied to the X transistor whereas in all other stages the reset pulse is applied to the Y transistor. The initial condition of the counter is established by applying a reset pulse to line 73. This will render transistor 41X non-conductive and transistor 41Y conductive. In all remaining stages of the counter the reset pulse will render the Y transistor non-conductive and the X transistor conductive. Since the input pulses are applied to the X transistors, it is apparent that in the initial condition of the counter stage 41 will switch in response to an input pulse whereas all successive stages will not respond to an input pulse.

The first pulse in waveform 25 is applied through line 27 and the first contact of selector switch 61B to the input of counter stage 41. This switches stage 41 so that transistor 41X is cut off and transistor 41Y becomes conductive as represented by the downward step in waveform 41 of FIG. 9. The output from transistor 41Y is applied to transistor 42Y of stage 42 and changes stage 42 so that it is then enabled to respond to an input pulse. The next successive pulse appears in waveform 26, and this is supplied through line 28 and the second contact of selector 61A to the input of stage 42. This input pulse causes stage 42 to change from the enabled condition back to the disabled condition. The successive transitions of stage 42 is represented by the pulse in waveform 42 of FIG. 9. The transition of stage 42 back to the disabled condition automatically changes stage 43 to the enabled condition so that it can be switched back by the third pulse which will appear on input line 28 as indicated by waveform 26 of FIG. 9. The successive switching of stage 43 enables stage 44 so that it will respond to the fourth pulse which appears on line 27 as indicated by waveform 25 of FIG. 6.

Thus, the first input pulse produces an enabling pulse in the first stage of the counter which is stepped stage-by-stage through the counter by the pulses from the input lines 27 and 28. Each successive stage is enabled by the preceding stage and is actuated by the input pulse corresponding thereto and this stepping operation is indicated by waveforms 41-48 of FIG. 6. A total of 20 pulses is required to produce an output from the last stage 60. These twenty pulses must be applied to the counter input lines 27 and 28 in the proper sequence in order to make the counter advance through a complete cycle and produce an output. If the pulse sequence does not correspond to the sequence in which the counter stages are connected to the input lines, the last counter stage 60 will not be triggered and thus no output will be produced.

It may be noted at this point that the enabling of any given counter stage is delayed somewhat with respect to the resetting of the next preceding stage in order to prevent the enabled stage from being actuated by the very same input pulse which actuated the preceding stage. In the illustrated embodiment, the delay is provided by the transistors of the counter stages, but separate delay circuitry such as resistance-capacitance integrator networks may be connected between each counter stage if desired. It should also be understood that the counter stages 41-48 of FIG. 8 may be monostable circuits rather than bistable circuits, with each monostable stage being actuated when an enabling signal produced by the preceding stage and an input pulse are applied thereto simultaneously.

The output from counter stage 60 is supplied through line 29 to the call bistable circuit 31. In the initial condition of this call circuit, transistor 122 is conductive and transistor 123 is cut off. The counter output cuts off transistor 122 and turns on transistor 123, and this applies a signal to the alarm control circuit 32. This signal renders transistor 124 conductive so that an energizing voltage is applied to the relay 125 connected thereto. Relay 125 closes its contacts 126 and 127 to activate the continuous alarm device 37 and the flashing alarm 33. A holding circuit for relay 125 is provided (not shown) so that it will remain energized after transistor 124 stops conducting.

The alarms 33 and 37 may be shut off by actuating a reset device such as the relay 38 which applies ground to the relay 125 shorting out its coil and opening contacts 126 and 127.

Resetting of the selective section 40 is accomplished automatically at the end of the call signal as previously mentioned. The reset signal is applied to line 73 by a pulse generator including a trigger circuit 72 and an amplifier 120. Initially, transistor 118 is conductive, transistor 119 is cut off, and transistor 120 is conductive. When a call is received, pulses are supplied through lines 112 and 113 to the reset timer 71. These pulses are translated by transistor 116 and are stored by the capacitor 117. Capacitor 117 applies a voltage to transistor 118 rendering it nonconductive, and this in turn causes transistor 119 to conduct. The initial switching of trigger circuit 72 has no effect on amplifier 120. As long as pulses are supplied to the timer 71, they are stored by capacitor 117. A short time after the last pulse in the call signal, capacitor 117 discharges to a level which renders transistor 118 conductive again, and this causes the trigger circuit 72 to switch back to the original condition. The switching of trigger circuit 72 causes amplifier 120 to generate a spike or pulse which is applied to line 73. The reset pulse is applied to all stages of the counter and also to the call bistable 31 and returns the bistables to the initial state. The resetting operation serves to condition the decoder for response to the next call. It will be understood that this conditioning may be accomplished at the beginning of a given call signal rather than at the end of the preceding one if this is desired.

*Special functions*

Figure 10:
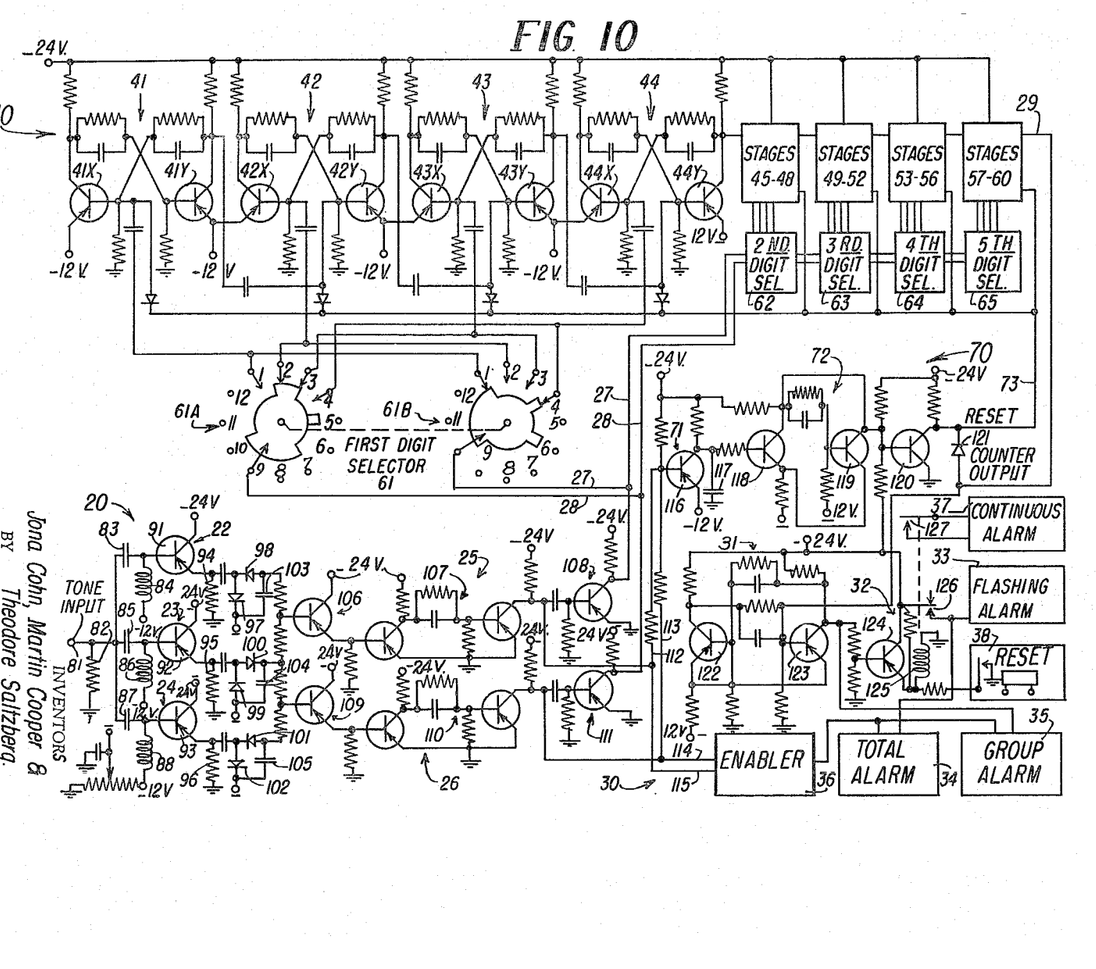
FIG. 10 is a detailed circuit diagram for a portion of the decoder unit of FIG. 3.

It is possible to provide a combined decoder and encoder utilizing the decoder circuits of FIGS. 8 and 10, and the encoder circuits of FIGS. 5-7. In this combined unit, there is a single counter circuit which serves both decoding and encoding functions. In the decoding mode, the inputs to the individual counter stages receives zero and one pulses from an input section identical with that illustrated in FIGS. 8 and 10. The decoding output and reset sections may also be identical with sections 40 and 70 of FIGS. 8 and 10. For encoding functions, the counter circuit receives pulses from clock circuits identical with those illustrated in FIGS. 5-7, and the outputs of the individual counter stages will be routed through gating circuits to tone oscillators identical to those illustrated in FIG. 7. With such a combined encoder and decoder, it is possible to provide inter-station calling between subscriber stations merely by operating the unit in an encoding mode.

The selective calling system of the invention may be adapted to provide specific control functions at the subscriber stations. This may be accomplished by adding additional counter stages or by using some of the counter stages of the decoder illustrated in FIG. 10 for function control purposes. When these function controlling stages respond to the incoming call in the manner previously described, an output may be taken from the stage and applied to a control device such as a relay, an alarm, or some other control device.

It is apparent from the foregoing description that the selective calling system of the invention provides high speed selective calling, and permits a very large number of subscriber stations to be handled by a single base station. The code capacity of the system is $2^n$ where $n$ is the number of counter stages provided in the encoder and decoder and corresponds to the number of zero and one pulses required to encode a call. Thus, the capacity of the system increases or decreases exponentially as the number of counter stages is increased or decreased. Also, any desired number of specific functions may be provided merely by utilizing some of the counter stages for this purpose. The system provides private calling, group calling, and total station calling.

We claim:

1. A selective system for providing selective calling of one of a plurality of stations by a code call signal which provides zero and one pulses sequenced according to a binary code, said selective system including in combination, a binary counter circuit including a series of two-state stages, said counter circuit having a starting condition in which the first stage of said series is enabled and all of the other stages of said series are disabled, an enabling circuit connected between each two successive stages of said counter circuit and applying an enabling voltage from the preceding one to the following one of said two successive stages for enabling said following stage to respond to one of said pulses, first and second signal lines, input means for receiving the code call signal and applying the zero pulses to said first signal line and the one pulses to said second signal line, and circuit means selectively connecting said two-state stages to one of said first and second signal lines in a predetermined sequence, such that said counter circuit is advanced through a cycle to provide a control voltage at the last stage in said series if the number and sequence of zero and one pulses provided by said code call signal corresponds to the number of stages in said counter circuit and the sequence in which said stages are connected to said signal lines, and means responsive to said control voltage to provide an indication of the reception of the code call.

2. A selective system in accordance with claim 1 and further automatic reset circuit means connected to said input means and each of said stages of said counter circuit, said reset circuit means storing the pulses provided by said input means and triggering after said pulses cease to apply a reset signal to said counter stages for returning said counter circuit to said starting condition.

3. A selective system for providing selective calling of one of a plurality of stations by a code call signal which provides zero and one pulses sequenced according to a binary code, said selective system including in combination, a binary counter chain including a series of bistable stages each having first and second parts, each of said stages having a first stable state in which said first part is energized and said second part is deenergized and having a second stable state in which said second part is energized and said first part is deenergized, said counter chain having a starting condition in which the first stage of said series is in said first stable state and all of the other stages of said series are in said second stable state, an enabling circuit connected between each two successive stages and applying an enabling voltage from the preceding one to the following one of the associated stages at the instant said preceding stage switches from said first state to said second state, said enabling voltage switching said following stage from said second state to said first state, first and second signal lines, input means for receiving the code call signal and applying the zero pulses to said first signal line and the one pulses to said second signal line, and a plurality of switches selectively connecting each of said stages to one of said first and second signal lines in a predetermined sequence and applying said pulses to said stages for switching the same in succession from said first stable state to said second stable state, such that said counter chain is advanced through a cycle if the number and sequence of zero and one pulses provided by said code call signal corresponds to the number of stages in said series and the sequence in which said stages are connected to said signal lines.

4. A selective system for providing selective calling of one of a plurality of stations by a code call signal which provides zero and one pulses sequenced in time according to a binary code, said selective system including in combination, a binary counter circuit including a plurality of two state stages each having first and second parts, each of said stages having a first state in which said first part is energized and said second part is deenergized, and having a second state in which said second part is energized and said first part is deenergized, first and second signal lines, input means for receiving the code call signal and applying the zero pulses to said first signal line and the one pulses to said second signal line, and circuit means selectively connecting each of said counter stages to one of said first and second signal lines in a predetermined sequence and applying said pulses to said stages for switching the same in sequential order, such that said counter circuit is advanced through a cycle if the number and sequence of zero and one pulses provided by said code call signal corresponds to the number of stages in said counter circuit and the sequence in which said stages are connected to said signal lines.

5. A selective system according to claim 4 in which said circuit means includes a plurality of switches.

6. A selective system for decoding a signal which provides a series of zero and one pulses sequenced according to a binary code, including in combination, first and second signal lines, input means for receiving the signal and applying the zero-pulses to said first signal line and the one-pulses to said second signal line, a plurality of bistable devices each having an output portion and first and second input portions, said devices each having the ability to switch from a first stable state to a second stable state when one of said pulses is applied to said second input portion thereof with such switching providing a control voltage at said output portion thereof, and each of said devices further having the ability to switch from said second stable state to said first stable state thereof when said control voltage is applied to said first input portion thereof, coupling means connecting said bistable devices in a chain and applying a control voltage from the output portion of each of said devices except the last one in said chain to the first input portion of the next successive device in said chain for enabling said next successive device to respond to one of said pulses, first circuit means supplying a conditioning signal to said devices, said conditioning signal establishing the first device in said chain in said first stable state with the remainder of said devices in said second stable state, and second circuit means selectively connecting each of said second input portions of said devices to one of said first and second signal lines in a predetermined sequence and applying said pulses to said second input portions for switching said devices in succession from said first stable state to said second stable state, such that said chain of devices is advanced through a cycle if the number and sequence of zero and one pulses in said series of pulses corresponds to the number of the devices in said chain and the sequence in which said devices are connected to said signal lines.

7. A selective calling system for use with a calling signal which provides a series of zero and one pulses in sequence according to a binary code, said system including in combination, input means for receiving the signal and supplying the zero and one pulses, a plurality of selective stages having first and second states, coupling means interconnecting said selective stages to form a counting chain, first circuit means for supplying a conditioning signal to said selective stages to establish the first stage of said chain in said first state and the remainder of said stages of said chain in said second state, second circuit means connected between said input circuit means and said chain of devices, said second circuit means selectively supplying said zero pulses to predetermined ones of said selective stages and said one pulses to the remainder of said stages, each of said selective stages being responsive to a corresponding one of said pulses to enable the next successive device of said chain to respond to the pulse corresponding thereto, whereby said chain of selective stages advances through a cycle if the number and sequence of zero and one pulses corresponds to the number of said selective stages in said chain and the sequence in which said second circuit means supplies said zero and one pulses to said selective stages, and means actuated by said chain of selective stages when the same advances through a cycle to indicate the reception of a properly coded call.

8. A system for encoding pulses including in combination, a pulse source for supplying a series of electric pulses, a plurality of bistable devices each having an output portion and first and second input portions, said devices each having the ability to switch from a first stable state to a second stable state when one of said pulses is applied to said second input portion thereof with such switching providing a control voltage at said output portion thereof, and each of said devices further having the ability to switch from said second stable state to said first stable state thereof when said control voltage is applied to said first input portion thereof, coupling means connecting said devices in a chain and applying the control voltage from the output portion of each of said devices except the last one in said chain to the first input portion of the next successive device in said chain for enabling said next successive device to respond to one of said pulses, first circuit means supplying a conditioning signal to said devices, said conditioning signal establishing the first device in said chain in said first stable state with the remainder of said devices in said second stable state, second circuit means applying said pulses from said pulse source to said second input portions of said bistable devices for switching said devices in succession from said first stable state to said second stable state, and circuit means responsive to the successive switching of said devices to provide zero and one pulses sequenced according to the binary code.

9. An encoding system according to claim 8 in which said circuit means providing zero and one pulses includes a plurality of gate circuits coupled respectively to said bistable devices, and selector means controlling said gate circuits to selectively pass and suppress the output of said bistable devices according to the binary code sequence.

10. An encoding system according to claim 8 in which said circuit means providing zero and one pulses includes a pair of signal lines, and means selectively coupling the output of each of said bistable devices to one of said signal lines with the selection between said signal lines corresponding to the binary code sequence.

11. A selective calling system for use with radio communications equipment, said system including in combination, means for producing a series of binary zero and binary one pulses and supplying the same to first and second signal lines in response to a received call signal, with binary zero pulses being supplied to one of said signal lines and binary one pulses being supplied to the other said signal line, a plurality of two-state circuits, coupling means interconnecting said two-state circuits to form a counting chain, first circuit means for supplying a conditioning signal to said two-state circuits to establish the first circuit in said chain in an enabled condition and the remainder of said two-state circuits of said chain in a disabled condition, and second circuit means connected to said signal lines and including switch means for selectively coupling said signal lines to said two-state circuits, said second circuit means selectively applying said pulses appearing on said first and second signal lines to said two-state circuits in accordance with the setting of said switch means so that said two-state circuits respond to a particular pulse sequence appearing on said signal lines, each of said two-state circuits being responsive in succession to a corresponding one of said pulses to apply an enabling voltage to the next successive stage in said chain, thereby enabling the same for response to the selected binary pulses applied thereto.

12. A selective calling system for use with radio communications equipment, said system including in combination, means for producing a series of binary zero and binary one pulses and supplying the same to first and second signal lines in response to a received code call signal, with binary zero pulses being supplied to one said signal line and binary one pulses being supplied to the other said signal line, a binary counter chain including a series of bistable stages each having first and second parts, each of said stages having a first stable state in which said first part is energized and said second part is de-energized, and having a second stable state in which said second part is energized and said first part is de-energized, said counter chain having a starting condition in which said first stage of said series is in said first stable state and all of the other stages of said series are in said second stable state, an enabling circuit connected between each two successive stages and applying an enabling voltage from the preceding one to the following one of the two associated stages at the instant said preceding stage switches from said first state to said second state, said enabling voltage switching said following stage from said second state to said first state, and circuit means for coupling said signal lines to said bistable stages, said circuit means including switch means to selectively apply said pulses appearing on said first and second signal lines to said bistable stages in accordance with the setting of said switch means so that said bistable stages respond to a particular pulse sequence appearing on said signal lines, with said pulses switching said bistable stages successively from said first state to said second state so that said counter chain advances through a cycle in response to a predetermined series of pulses which corresponds to the setting of said switch means.

13. A selective calling system for use with radio communications equipment, said system including in combination, means for producing a series of binary zero and binary one pulses and applying the same to first and second signal lines in response to a received code call signal, with binary zero pulses being applied to one said signal line and binary one pulses being applied to the other said signal line, a plurality of bistable devices each having an output portion and first and second input portions, said devices each having the ability to switch from a first stable state to a second stable state when one of said pulses is applied to said second input portion thereof, with such switching providing a control voltage at said output portion thereof, and each of said devices further having the ability to switch from said second stable state to said first stable state thereof when said control voltage is applied to said first input portion thereof, coupling means connecting said bistable devices in a chain, said coupling means applying the control voltage from the output portion of each of said bistable devices except the last one in said chain to the first input portion of the next successive bistable device in said chain for enabling the next successive device to respond to one of said input pulses, first circuit means supplying a conditioning signal to said devices, said conditioning signal establishing the first device in said chain in said first stable state with the remainder of said devices in said second stable state, and second circuit means for coupling said signal lines to said second input portion of said devices for switching said devices in succession from said first stable state to said second stable state, said second circuit means including switch means to selectively apply said pulses appearing on said first and second signal lines to said second input portions of said devices in accordance with the setting of said switch means so that said bistable devices respond to a particular pulse sequence appearing on said signal lines, such that said chain of devices is advanced through a cycle in response to a predetermined series of pulses which corresponds to the setting of said switch means in said chain of devices.

References Cited by the Examiner
UNITED STATES PATENTS

| | | | |
|---|---|---|---|
| 2,576,099 | 11/51 | Bray | 340—347 |
| 2,886,239 | 5/59 | Reumerman | 235—153 |
| 3,012,226 | 12/61 | Abbott | 340—164 |
| 3,017,620 | 1/62 | Abzug | 340—168 |
| 3,035,248 | 5/62 | Grose et al. | 340—163 |

NEIL C. READ, *Primary Examiner.*

L. MILLER ANDRUS, *Examiner.*